US011151200B2

(12) United States Patent
Okada et al.

(10) Patent No.: US 11,151,200 B2
(45) Date of Patent: Oct. 19, 2021

(54) INFORMATION PROCESSING APPARATUS AND NON-TRANSITORY COMPUTER READABLE MEDIUM STORING INFORMATION PROCESSING PROGRAM FOR MANAGING ATTRIBUTE INFORMATION OF DOCUMENT

(71) Applicant: FUJIFILM Business Innovation Corp., Tokyo (JP)

(72) Inventors: Shigeru Okada, Kanagawa (JP);
Shusaku Kubo, Kanagawa (JP);
Masanori Yoshizuka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 29 days.

(21) Appl. No.: 16/520,371

(22) Filed: Jul. 24, 2019

(65) Prior Publication Data

US 2020/0301977 A1 Sep. 24, 2020

(30) Foreign Application Priority Data

Mar. 20, 2019 (JP) .............................. JP2019-052609

(51) Int. Cl.
*G06F 17/00* (2019.01)
*G06F 16/93* (2019.01)
*G06F 3/0482* (2013.01)
*G06K 9/00* (2006.01)
*G06F 40/106* (2020.01)

(52) U.S. Cl.
CPC ............ *G06F 16/93* (2019.01); *G06F 3/0482* (2013.01); *G06F 40/106* (2020.01); *G06K 9/00469* (2013.01); *G06K 2209/01* (2013.01)

(58) Field of Classification Search
CPC ...... G06F 16/93; G06F 40/106; G06F 3/0482; G06K 2209/01; G06K 9/00469
See application file for complete search history.

(56) References Cited

U.S. PATENT DOCUMENTS

| 2006/0053137 A1* | 3/2006 | Tanimoto | ............... G06F 16/381 |
| 2007/0206884 A1* | 9/2007 | Kato | ........................ G06K 9/72 |
| | | | 382/305 |
| 2019/0340428 A1* | 11/2019 | Wickett | ................. G06Q 50/18 |
| 2020/0005258 A1* | 1/2020 | Miller | .................. G06Q 20/102 |

FOREIGN PATENT DOCUMENTS

JP 2004240488 8/2004

* cited by examiner

*Primary Examiner* — Scott T Baderman
*Assistant Examiner* — Barbara M Level
(74) *Attorney, Agent, or Firm* — JCIPRNET

(57) ABSTRACT

An information processing apparatus includes: an attribute giving unit that specifies a second date, which is a date after a first date corresponding to a date, on which processing is performed with respect to a document, or a date written in the document, based on information written in the document, and that gives the second date as attribute information of the document.

19 Claims, 11 Drawing Sheets

US 11,151,200 B2

INFORMATION PROCESSING APPARATUS AND NON-TRANSITORY COMPUTER READABLE MEDIUM STORING INFORMATION PROCESSING PROGRAM FOR MANAGING ATTRIBUTE INFORMATION OF DOCUMENT

CROSS-REFERENCE TO RELATED APPLICATIONS

This application is based on and claims priority under 35 USC 119 from Japanese Patent Application No. 2019-052609 filed Mar. 20, 2019.

BACKGROUND

(i) Technical Field

The present invention relates to an information processing apparatus and a non-transitory computer readable medium storing an information processing program.

(ii) Related Art

JP2004-240488A discloses a document management apparatus for extracting a part indicative of a year, month, date, or time from an electronic document, estimating a period during which the electronic document is prepared from data relevant to the extracted year, month, date, or time, and giving the estimated period as attribute information of the electronic document.

SUMMARY

There is a case where it is desired to give a date, on which there is a possibility that a document is necessary in a future, as attribute information of the document.

Aspects of non-limiting embodiments of the present disclosure relate to an information processing apparatus and a non-transitory computer readable medium storing an information processing program that give the date, on which there is the possibility that the document is necessary in the future, with respect to the document as the attribute information of the document.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: an attribute giving unit that specifies a second date, which is a date after a first date corresponding to a date, on which processing is performed with respect to a document, or a date written in the document, based on information written in the document, and that gives the second date as attribute information of the document.

BRIEF DESCRIPTION OF THE DRAWINGS

Exemplary embodiment(s) of the present invention will be described in detail based on the following figures, wherein.

DETAILED DESCRIPTION

Figure 1:
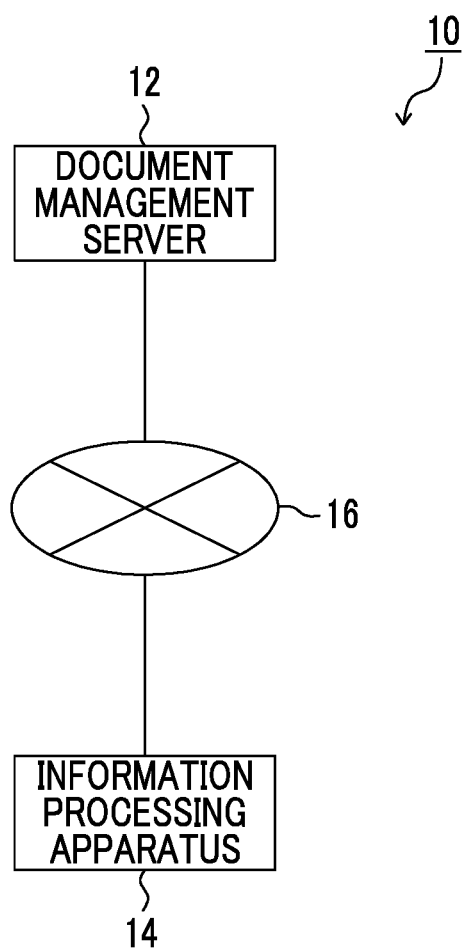
FIG. 1 is a schematic diagram illustrating a configuration of an information processing system according to an exemplary embodiment.

FIG. 1 is a schematic diagram illustrating a configuration of an information processing system 10 according to an exemplary embodiment. The information processing system 10 includes a document management server 12 that provides a document management service to a user, and an information processing apparatus 14. The document management server 12 and the information processing apparatus 14 are communicably connected through a communication line 16 including the Internet or a LAN. The information processing system 10 may include a plurality of document management servers 12. In addition, the information processing apparatus 14 may include a plurality of apparatuses.

The document management server 12 includes a general server computer. The document management server 12 stores an electronic document transmitted from the information processing apparatus 14, transmits the stored electronic document to the information processing apparatus 14 at a request of the user, or provides a service, such as an edit of the stored electronic document, to the user at the request of the user.

Although the information processing apparatus 14 according to the exemplary embodiment is a multi-function printer, the information processing apparatus 14 may be another apparatus. For example, the information processing apparatus 14 may be a personal computer, a tablet terminal, or the like. It is possible for the information processing apparatus 14 to transmit the acquired electronic document to the document management server 12, and to perform a process on the electronic document stored in the document management server 12.

Figure 2:
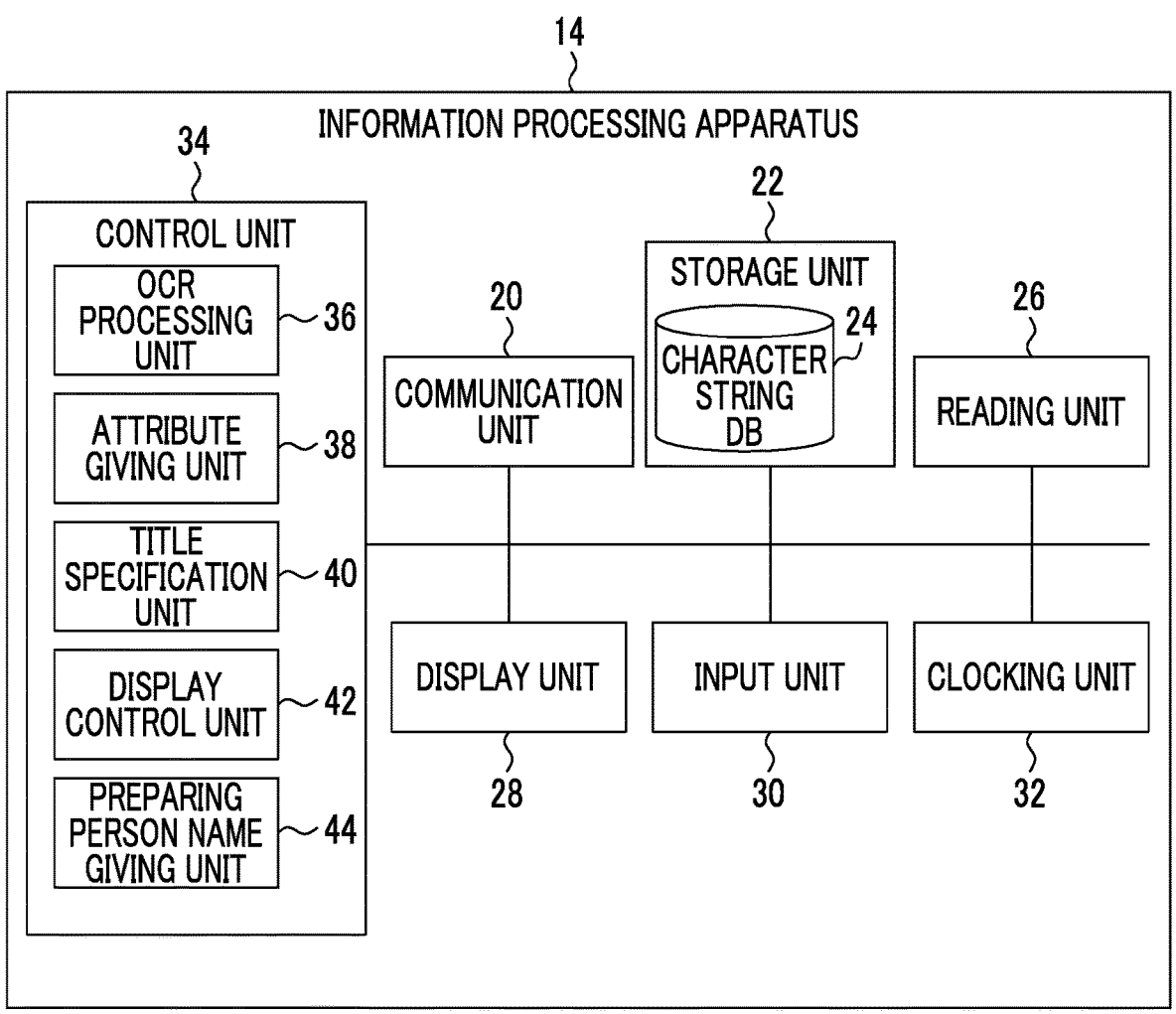
FIG. 2 is a schematic diagram illustrating a configuration of an information processing apparatus according to an exemplary embodiment.

FIG. 2 is a schematic diagram illustrating a configuration of the information processing apparatus 14.

A communication unit 20 includes, for example, a communication module or the like. The communication unit 20 is used to communicate with the document management server 12 and another apparatus. It is possible for the communication unit 20 to receive the electronic document (in the specification, written as a "target document"), which is a processing target in the exemplary embodiment, from the document management server 12 or another apparatus. That is, the communication unit 20 fulfills a function as a document acquisition unit.

A storage unit 22 includes, for example, a ROM, a RAM, a hard disk, or the like. The storage unit 22 stores an information processing program for operating respective units of the information processing apparatus 14. In addition, the storage unit 22 temporarily stores the target document acquired by the information processing apparatus 14. Furthermore, as illustrated in FIG. 2, the storage unit 22 stores a character string Database (DB) 24.

The character string DB 24 stores preparation date character information which indicates a character string indicative of a preparation date of the target document. The character string indicative of the preparation date includes, for example, "preparation date", "date", or the like. It is apparent that the character string indicative of the preparation date is not limited thereto.

The character string DB 24 stores deadline character information which indicates a character string relevant to a deadline. The character string relevant to the deadline includes, for example, "payment", "deadline", "valid", or the like. It is apparent that the character string relevant to the deadline is not limited thereto.

In addition, the character string DB 24 stores period character information which indicates a character string relevant to a period. The character string relevant to the period includes, for example, "week", "month", "day", or the like. It is apparent that the character string relevant to the period is not limited thereto.

Furthermore, the character string DB 24 stores preparing person character information which indicates a character string relevant to a name of a document preparing person. In the exemplary embodiment, the document preparing person is expressed using a company name, and thus character information which indicates the company name is stored as the preparing person character information. The character string indicative of the company name includes, for example, "corporation", "(Inc.)", "received from", "sold to", "from", or the like. It is apparent that the character string indicative of the company name is not limited thereto. In addition, a character string indicative of a company name, to which the user who uses the information processing apparatus 14 belongs, may be included as the preparing person character information.

The character string DB 24 is previously prepared by a manager or the like of the information processing apparatus 14.

A reading unit 26 includes, for example, a light source, a Charge Coupled Device (CCD) image sensor, an imaging unit, or the like. The reading unit 26 generates the electronic document (that is, the target document) corresponding to a paper document by performing a scanning process with respect to the paper document. In addition, the reading unit 26 generates the electronic document (that is, the target document) corresponding to the paper document by photographing the paper document. As above, the reading unit 26 also fulfills the function as the document acquisition unit.

A display unit 28 includes, for example, a liquid crystal display or the like. Various screens are displayed on the display unit 28, and thus various pieces of information are provided to the user.

An input unit 30 includes a touch panel, a button, or the like. In addition, in a case where the information processing apparatus 14 is the personal computer, a keyboard or a mouse may be included as the input unit 30. The input unit 30 is used to input an instruction of the user to the information processing apparatus 14.

A clocking unit 32 includes, for example, a timer IC, a crystal resonator, a clock module, or the like. The clocking unit 32 clocks a current time, which includes a year, month, and day, and outputs current time information which indicates the current time to a control unit 34 which will be described later.

The control unit 34 includes, for example, a CPU or a microcontroller. The control unit 34 controls the respective units of the information processing apparatus 14 according to the information processing program stored in the storage unit 22. In addition, as illustrated in FIG. 2, the control unit 34 also functions as an OCR processing unit 36, an attribute giving unit 38, a title specification unit 40, a display control unit 42, and a preparing person name giving unit 44. Meanwhile, in a case where the information processing apparatus 14 is the personal computer or the tablet terminal, the control unit 34 may include a function as a document preparation unit. The document preparation unit executes a document preparation application in the information processing apparatus 14, and prepares the electronic document (that is, the target document) based on the instruction from the user. That is, the document preparation unit also fulfills the function as the document acquisition unit.

The OCR processing unit 36 extracts the character string from the target document using an Optical Character Recognition (OCR) technology. It is possible to use a technology according to the related art as the OCR technology.

The attribute giving unit 38 gives attribute information with respect to the target document. Specifically, the attribute giving unit 38 specifies a data, on which there is a probability that the target document is necessary in the future, based on details written in the target document extracted by the OCR processing unit 36, and gives the date as the attribute information of the target document.

Meanwhile, in a case where the date is given as the attribute information of the target document, for example, a file name of the target document may include the date and meta data of the target document may include the date. Hereinafter, details of a process of the attribute giving unit 38 will be described.

First, the attribute giving unit 38 specifies a first date for the target document. Here, the first date is a date, on which processing is performed with respect to the target document, or a date written in the target document.

The date, on which the process is performed with respect to the target document, includes, for example, a date on which an electronic process is performed on the target document. As an example of the date, on which the electronic process is performed, there is a date on which any updating process is performed with respect to the document. As an example of the date, on which any updating process is performed with respect to the document, there may be a date on which a process of changing an updating date and time in association with the document is performed. A type of the date, on which the electronic process is performed, includes a date on which the target document is acquired, a date on which the target document is stored in the document management server 12, or the like. The date, on which the target document is acquired, includes, for example, a date on which the communication unit 20 receives the target document, a date on which the reading unit 26 generates the target document, and a date on which the document preparation unit of the control unit 34 prepares the target document. It is possible to acquire the date, on which the target document is acquired, in such a way that the attribute giving unit 38 maintains time at which the clocking unit 32 clocks in a case where the target document is acquired. In addition, it is possible to acquire the date, on which the target document is stored in the document management server 12, in such a way that the attribute giving unit 38 maintains time at which the clocking unit 32 clocks in a case where the communication unit 20 transmits the target document to the document management server 12.

A case where a plurality of dates are written in the target document is taken into consideration. Ina case where the date written in the target document is set to the first date, the attribute giving unit 38 specifies a date which is the preparation date of the target document based on information written in the target document, and sets the specified preparation date to the first date. For example, the attribute giving unit 38 refers to the preparation date character information stored in the character string DB 24, and determines whether or not the character string, such as the "preparation date" or the "date", which is indicative of the preparation date of the target document, is extracted from a peripheral area of each date extracted from the target document. The attribute giving unit 38 specifies a date including the peripheral area, from which the character string indicative of the preparation date of the target document is extracted, as the preparation date, and sets the date to the first date.

The peripheral area may be an area having a prescribed size including the extracted date. Otherwise, the attribute giving unit 38 may determine the peripheral area according to a structure of a sentence of the target document. For example, in the target document, an area, which includes a whole paragraph including the extracted date, may be set to the peripheral area. In addition, in a case where a spot including the date is expressed using a table, an area which includes the whole table may be set to the peripheral area.

Figure 3:
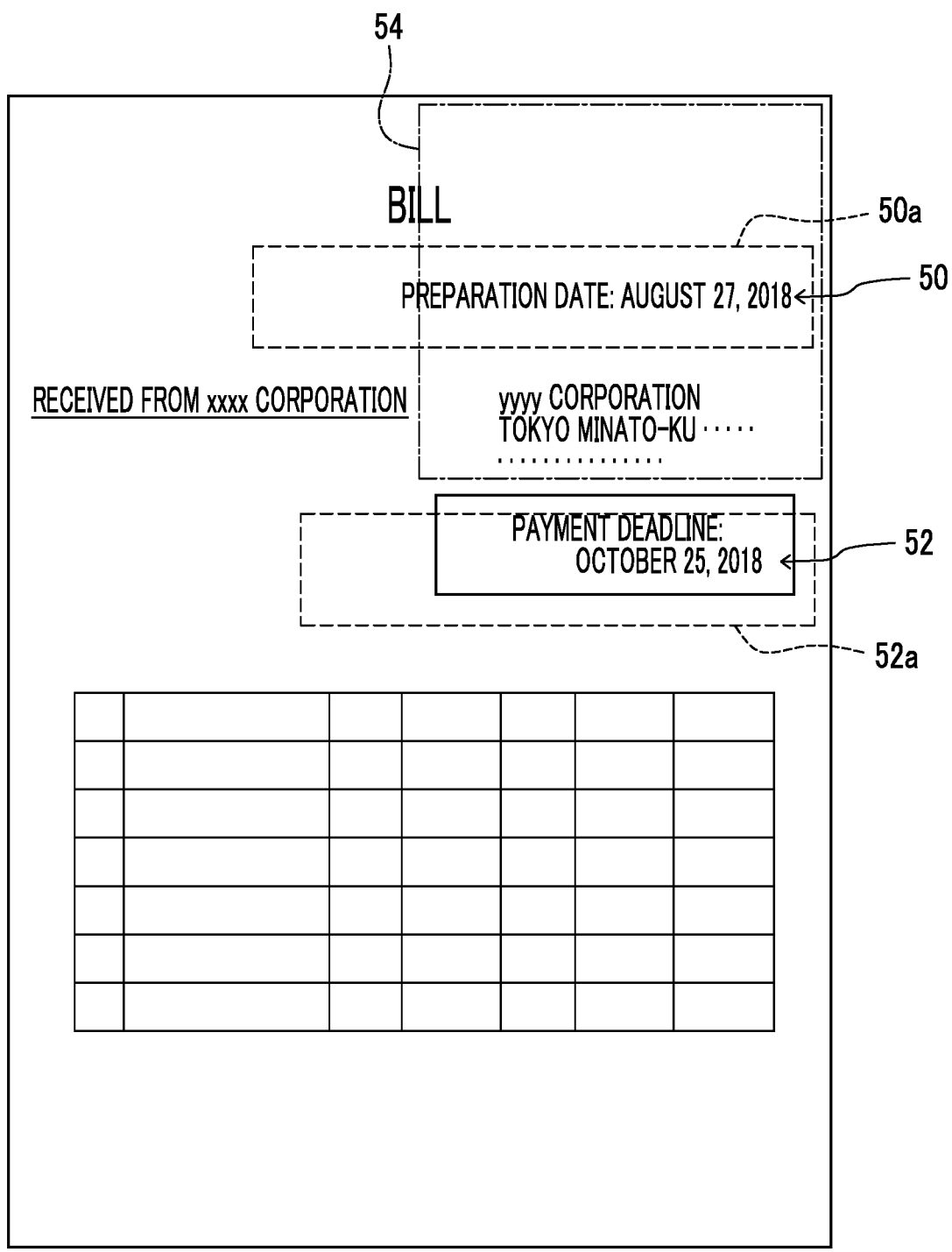
FIG. 3 is a first diagram illustrating a first example of a target document.

FIG. 3 illustrates a first example of the target document. The target document illustrated in FIG. 3 is a bill, and a preparation date of the bill is illustrated as a date 50 and a payment deadline is illustrated as a date 52. First, the attribute giving unit 38 extracts the date 50 ("Aug. 27, 2018") and the date 52 ("Oct. 25, 2018") from character strings extracted through an OCR process performed by the OCR processing unit 36. Subsequently, the attribute giving unit 38 determines whether or not a character string indicated by the preparation date character information stored in the character string DB 24 exists, respectively, in a peripheral area 50*a* of the date 50 and a peripheral area 52*a* of the date 52. In the example of FIG. 3, the character string "preparation date" exists in the peripheral area 50*a* and the character string indicated by the preparation date character information does not exist in the peripheral area 52*a*, and thus the attribute giving unit 38 sets the date 50 to the first date.

In addition, information relevant to a format of the target document is previously given from the user or a format of the target document to be processed by the information processing apparatus 14 is previously determined. Therefore, in a case where it is possible for the attribute giving unit 38 to previously grasp the format of the target document, it is possible for the attribute giving unit 38 to specify a date area, in which the preparation date is written, of the target document based on the format of the target document. Furthermore, it is possible for the attribute giving unit 38 to set a date, which exists in a specified date area, to the preparation date of the target document, that is, the first date.

For example, in the example of FIG. 3, in a case where an upper right area 54, which is a fixed area located on a right corner of the target document, is specified as the date area, the attribute giving unit 38 sets the date 50, which exists in the upper right area 54, to the first date based on the format of the target document.

In addition, in a case where a font size of the preparation date of the document is smaller than a font size of another character string in the target document, the attribute giving unit 38 may set a date illustrated with a small font size to the first date based on the format of the target document among the plurality of dates extracted from the target document. In a case where the character string "preparation date" exists and the date illustrated with the small font size exists among the plurality of dates extracted from the target document, the date may be set to the first date.

Subsequently, the attribute giving unit 38 specifies a second date which is a date after the first date. Specifically, the attribute giving unit 38 specifies the second date based on information written in the target document. Moreover, the specified second date is given as the attribute information of the target document. It is possible to specify the second date given as the attribute information of the target document using various methods which will be described below.

First, the attribute giving unit 38 determines whether or not the second date is extracted from the target document, that is, whether or not the second date is written in the target document. For example, in a case where it is assumed that the first date is the date 50 in the target document illustrated in FIG. 3, the date 52, which is a date after the date 50, is specified as the second date. In a case where one second date is specified from the target document as in the target document illustrated in FIG. 3, it is possible to give the second date as the attribute information of the target document. Meanwhile, as described above, the second date only means the date after the first date, and the second date may be a past date, compared to a current point of time.

In a case where the period is written in the target document, it is possible for the attribute giving unit 38 to set a date after the period, which is written in the target document from the first date, to the second date.

Figure 4:
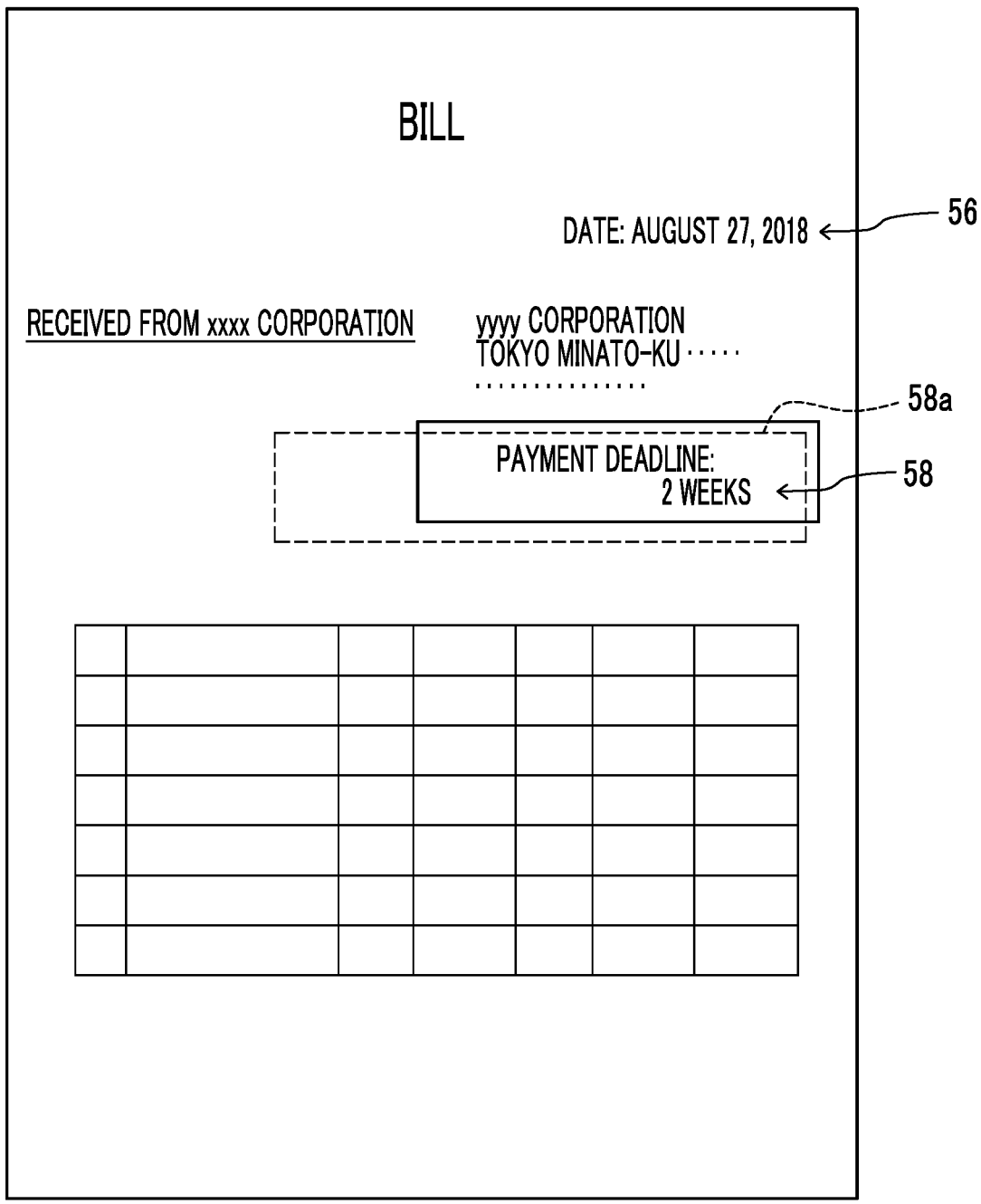
FIG. 4 is a diagram illustrating a second example of the target document.

FIG. 4 illustrates a second example of the target document. Although the target document illustrated in FIG. 4 is also a bill, the payment deadline is written as a period 58 instead of a date. Here, it is assumed that the date 56 is specified as the first date. The attribute giving unit 38 refers to the period character information stored in the character string DB 24, and extracts the character string indicative of the period from the character strings extracted through the OCR process of the OCR processing unit 36. As a result, the period 58 is extracted in the example of FIG. 4. Therefore, the attribute giving unit 38 specifies, as the second date, "Sep. 10, 2018", which is a date after the period 58 (2 weeks), from the date (Aug. 27, 2018), which is the first date. Moreover, the second date is given as the attribute information of the target document.

The attribute giving unit 38 refers to the deadline character information stored in the character string DB 24, and determines whether or not character strings indicative of the deadline as the specific character string, such as "payment", "deadline", or "valid", from a peripheral area 58*a* of the period 58 extracted from the target document. The attribute giving unit 38 may give the data after the period 58, in which the character string indicative of the deadline exists in the peripheral area 58*a*, as the attribute information of the target document from the first date. Thereby, even in a case where a plurality of periods are written in the target document and a plurality of second dates are specified using the first date and the plurality of periods, it is possible to specify the second date which is more appropriate, that is, in which there is a high possibility that the target document is further necessary.

Meanwhile, the attribute giving unit 38 first determines whether or not the second date is extracted from the target document. Thereafter, in a case where the second date is not extracted from the target document, the attribute giving unit 38 may specify the second date based on the period extracted from the target document.

A case where the plurality of second dates are extracted from the target document, that is, a case where the plurality of second dates are written in the target document is conceivable. In this case, the attribute giving unit 38 refers to the deadline character information stored in the character string DB 24, and determines whether or not the character string indicative of the deadline is extracted as the specific character string, such as "payment", "deadline", or "valid", from a peripheral area of the second date extracted from the target document. It is possible for the attribute giving unit 38 to give the second date, in which the character string indicative of the deadline exists in the peripheral area, as the attribute information of the target document.

Figure 5:
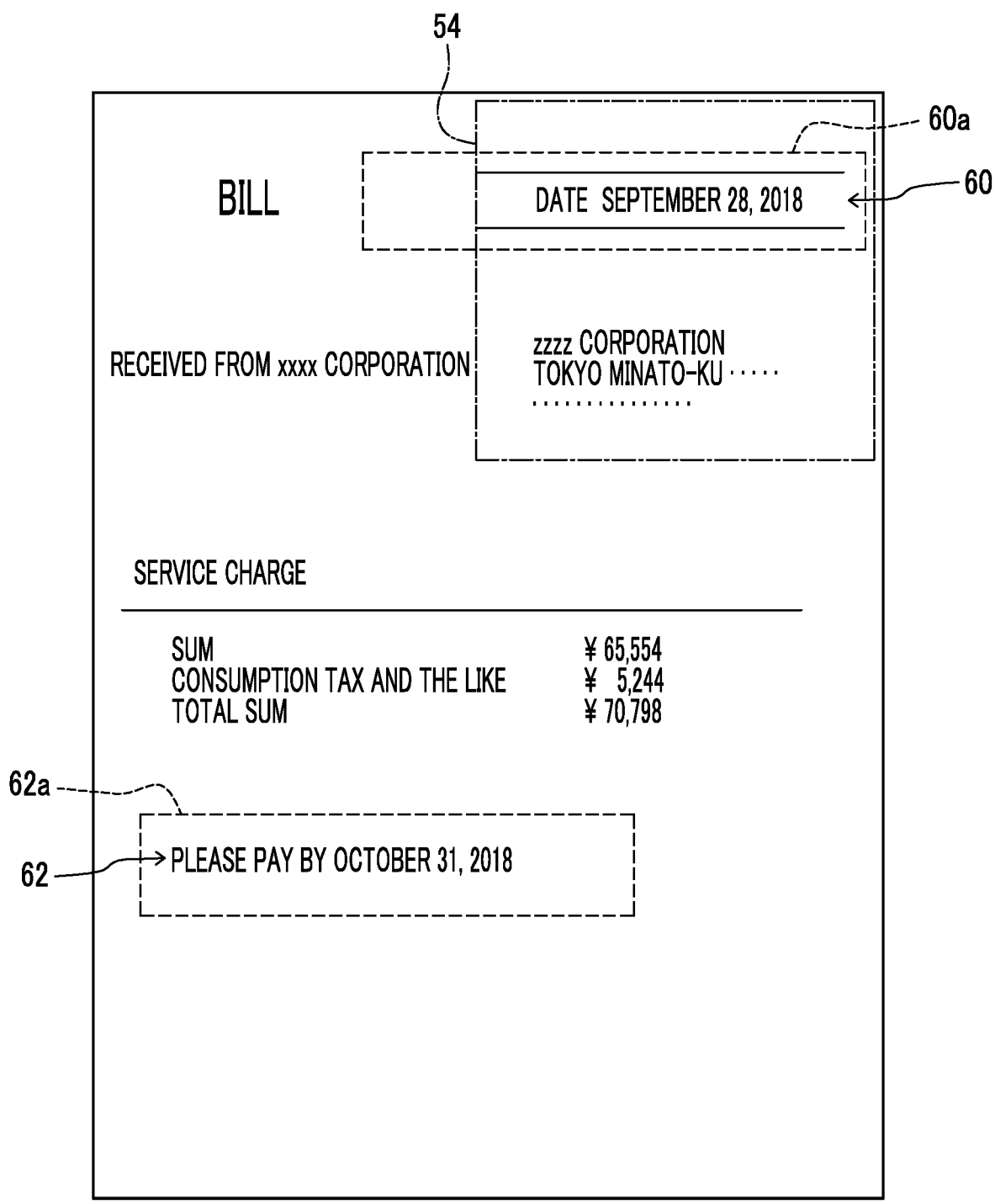
FIG. 5 is a diagram illustrating a third example of the target document.

FIG. 5 illustrates a third example of the target document. The target document illustrated in FIG. 5 is also a bill. Although not being written in the target document in the example of FIG. 5, it is assumed that "Aug. 27, 2018", which is a date on which the target document is acquired, is specified as the first date. Therefore, both two dates 60 and 62 extracted from the target document illustrated in FIG. 5 are the second dates. In this case, the attribute giving unit 38 determines whether or not a character string indicated by the deadline character information stored in the character string DB 24 exists, respectively, in a peripheral area 60*a* of the date 60 and a peripheral area 62*a* of the date 62. In the example of FIG. 5, the character string "payment" exists in the peripheral area 62*a*, and the character string indicated by the deadline character information does not exist in the peripheral area 60*a*, and thus the attribute giving unit 38 gives the date 62 as the attribute information of the target document.

In addition, in a case where the plurality of second dates are specified from the target document, a second date, which is not different largely from the first date, may be given as the attribute information of the target document among the plurality of second dates. A reason for this is that, for example, in a case where a date after 10 years is written in the target document, there is a case where it is worthless that the date is given as the attribute information of the target document. Meanwhile, similarly to the case where the plurality of second dates are specified based on the plurality of periods written in the target document, the second date, which is not different largely from the first date, may be given as the attribute information of the target document among the plurality of specified second dates.

In addition, in a case where the format of the target document is previously known and in a case where the plurality of second dates are extracted from the target document and some of the plurality of second dates exist in the date area, in which the preparation date is written, in the target document, the attribute giving unit 38 may give the second date, which exists other than the date area, as the attribute information of the target document among the plurality of second dates. A reason for this is that there is a high possibility that the second date, which exists in the date area, is the preparation date of the document and there is a low possibility that the second date, which exists in the date area, is a date on which the document is necessary in the future.

Furthermore, in a case where the plurality of second dates are extracted from the target document, the second date to be given as the attribute information of the target document may be determined according to fonts of the plurality of second dates. For example, a boldface or underline-drawn second date may be given as the attribute information among the plurality of second dates. Similarly, in the case where the plurality of second dates are specified based on the plurality of periods written in the target document, a second date specified based on a boldface or underline-drawn period may be given as the attribute information among the plurality of periods.

Returning to FIG. 2, the title specification unit 40 specifies a title of the target document. It is possible to acquire the title of the target document using various methods. For example, in many cases, the title is written in an upper area of the document using a relatively large font in the document, and thus it is possible for the title specification unit 40 to set a character string extracted from the upper area of the document and a character string having a font which satisfies a specific condition (for example, a font size is equal to or larger than a specified value) as the title.

Figure 6:
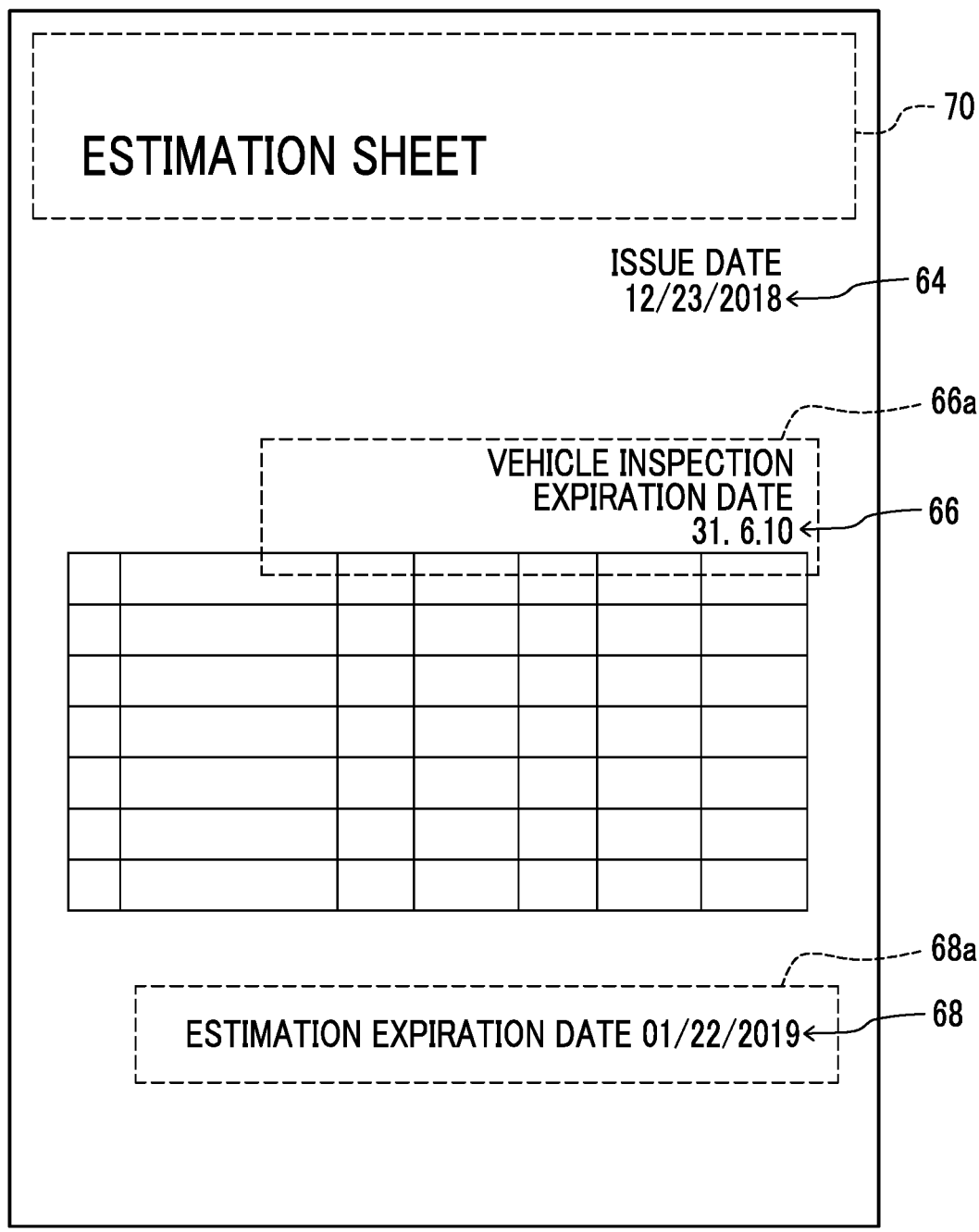
FIG. 6 is a diagram illustrating a fourth example of the target document.

FIG. 6 illustrates a fourth example of the target document. The target document illustrated in FIG. 6 is an estimation sheet for a vehicle inspection. The title specification unit 40 acquires a character string "estimation sheet" from a prescribed upper area 70 of the target document, determines a font of the character string, and, in a case where the font satisfies the specific condition, specifies the "estimation sheet" as the title of the target document.

In addition, in a case where it is required to include the title in a file name of the target document, the title specification unit 40 may specify the file name of the target document as the title. In addition, in a case where it is required to include the title in the meta data of the target document, the title specification unit 40 may specify the title with reference to the meta data of the target document.

The attribute giving unit 38 may specify the second date to be given as the attribute information of the target document based on the title specified by the title specification unit 40. In a case where the plurality of second dates are extracted from the target document, that is, in the case where the plurality of second dates are written in the target document, the attribute giving unit 38 may determine whether or not at least a part of the title of the target document specified by the title specification unit 40 exists as the specific character string in the peripheral area of each of the second dates extracted from the target document, and the attribute giving unit 38 may give the second date, on which at least a part of the title exists in the peripheral area, as the attribute information of the target document.

For example, in the example of FIG. 6, it is assumed that the "estimation sheet" is specified as the title, a date 64 is specified as the first date, and dates 66 and 68, which are the plurality of dates are extracted from the target document. In this case, the attribute giving unit 38 determines whether or not at least a part of the "estimation sheet", which is the title, exists, respectively, in a peripheral area 66*a* of the date 66 and a peripheral area 68*a* of the date 68. In the example of FIG. 6, a character string "estimation" exists in the peripheral area 68*a* and at least a part of the title does not exist in the peripheral area 66*a*, and thus the attribute giving unit 38 gives the date 68 as the attribute information of the target document.

In addition, in a case where the plurality of periods are extracted from the target document, that is, in a case where the plurality of periods are written in the target document, the attribute giving unit 38 may determine whether or not at least a part of the title of the target document, which is specified by the title specification unit 40 as the specific character string, exists in the peripheral area of each of the periods extracted from the target document, and the attribute giving unit 38 may give the date after the period, on which at least a part of the title exists in the peripheral area, from the first date as the attribute information of the target document.

Returning to FIG. 2, the display control unit 42 displays various screens on the display unit 28. Specifically, in a case where the plurality of second dates are specified through the process performed by the attribute giving unit 38, the display control unit 42 displays a date selection screen on the display unit 28, the date selection screen allowing the user to select the second date to be given as the attribute information of the target document among the plurality of second dates. Here, the case where the plurality of second dates are specified includes the case where the plurality of second dates are written in the target document, the case where the plurality of periods are written in the target document, and a case where both the second date and the period are written in the target document. Meanwhile, it is possible to previously set, by the user, whether or not to display the date selection screen in the case where the plurality of second dates are specified.

Figure 7:
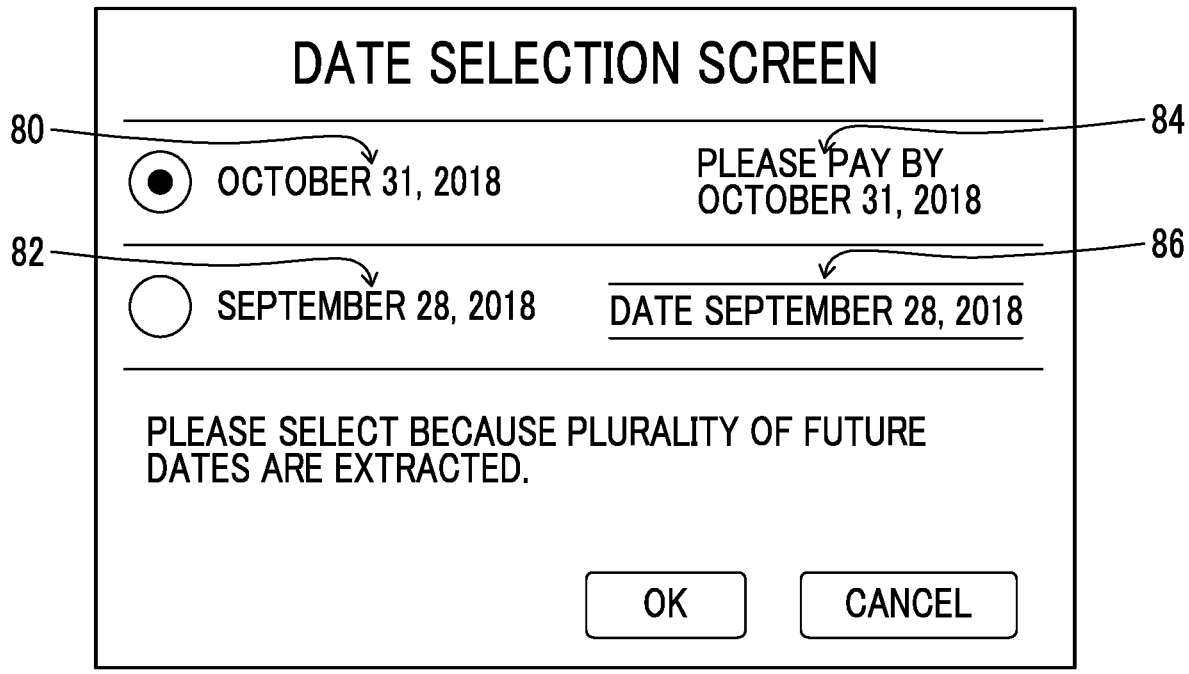
FIG. 7 is a first example of a date selection screen.

FIG. 7 illustrates an example of the date selection screen. As illustrated in FIG. 7, the date selection screen includes a plurality of specified second dates 80 and 82. It is possible for the user to select the second date to be given to the target document by selecting any of the second dates using a radio button and pressing an OK button.

For example, it is preferable that the date selection screen includes a peripheral area of a description in the target document, the description corresponding to each second date. Here, the peripheral area of the description in the target document, is the peripheral area of the second date in a case where the second date is written in the target document and is the peripheral area of the period in a case where the period is written in the target document. Hereinafter, the peripheral area is simply written as a "peripheral area". In a case where the peripheral area is displayed, it is possible for the user to select a more appropriate second date. FIG. illustrates an example in which a peripheral area 84 corresponding to the second date 80 and a peripheral area 86 corresponding to the second date 82 are displayed.

In addition, for example, it is preferable that the display control unit 42 refers to the deadline character information stored in the character string DB 24, and highlights the second date, on which the character string indicative of the deadline in the peripheral area, compared to a second date on which the character string indicative of the deadline does not exist in the peripheral area. In the example of FIG. 7, the character string "payment" exists in the peripheral area 84 and the character string indicative of the deadline does not exist in the peripheral area 86, and thus the second date 80 corresponding to the peripheral area 84 is highlighted, compared to a second date 82 corresponding to the peripheral area 86.

In addition, the second date to be highlighted on the date selection screen may be determined according to a font of the second date in the target document. For example, the second date written in the boldface in the target document may be highlighted, compared to a second date which is not in the boldface in the target document. Otherwise, the second date which is drawn with the underline in the target document may be highlighted, compared to a second date which is not drawn with the underline in the target document. In the same manner, the second date, which corresponds to the period and which is to be highlighted on the date selection screen, may be determined according to a font of the period in the target document.

Meanwhile, various aspects are taken into consideration as an aspect of the highlight. For example, as illustrated in FIG. 7, the second date 80 may be displayed above compared to a second date 82, the font of the second date 82 may be different from the font of the second date 80, and a specific icon or message may be attached to the second date 80.

In addition, the display control unit 42 may highlight the second date, on which at least a part of the title exists in the peripheral area, compared to a second date on which at least a part of the title of the target document specified by the title specification unit 40 does not exist in the peripheral area.

In addition, in a case where it is possible to specify only the second date, on which the character string indicative of the deadline does not exist, in the peripheral area, or in a case where it is possible to specify only the second date, on which at least a part of the title of the target document does not exist, in the peripheral area, the display control unit 42 may determine that there is a possibility that the second date is not appropriate as a data to be given as the attribute information of the target document, and may display the date selection screen, which includes an input field allowing the user to input the specified second date and a data to be given as the attribute information of the target document, on the display unit 28.

Figure 8:
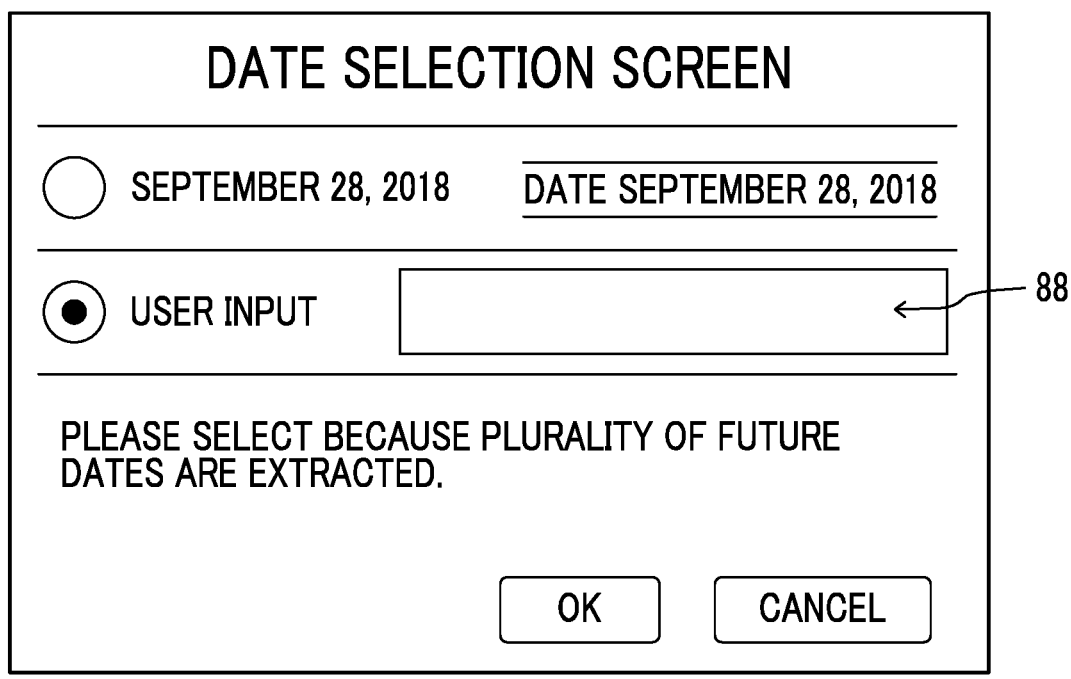
FIG. 8 is a second example of the date selection screen.

FIG. 8 illustrates the date selection screen which includes an input field 88. It is possible for the user, on the date selection screen, to select the second date in a case where the second date specified by the attribute giving unit 38 is determined to be appropriate, and to input the date given as the attribute information to the input field 88 in a case where the second date is determined to be not appropriate.

In addition, even in a case where it is possible to specify only the second date which is different from the first date by a prescribed threshold or larger, the display control unit 42 may display the date selection screen, which includes the specified second date and the input field 88, as illustrated in FIG. 8.

Returning to FIG. 2, the preparing person name giving unit 44 extracts the preparing person name of the target document from the target document, and gives the extracted preparing person name as the attribute information of the target document. As described above, in the exemplary embodiment, the document preparing person is expressed using the company name, and thus the preparing person name giving unit 44 extracts the company name from the target document and gives the company name as the attribute information of the target document.

Figure 9:
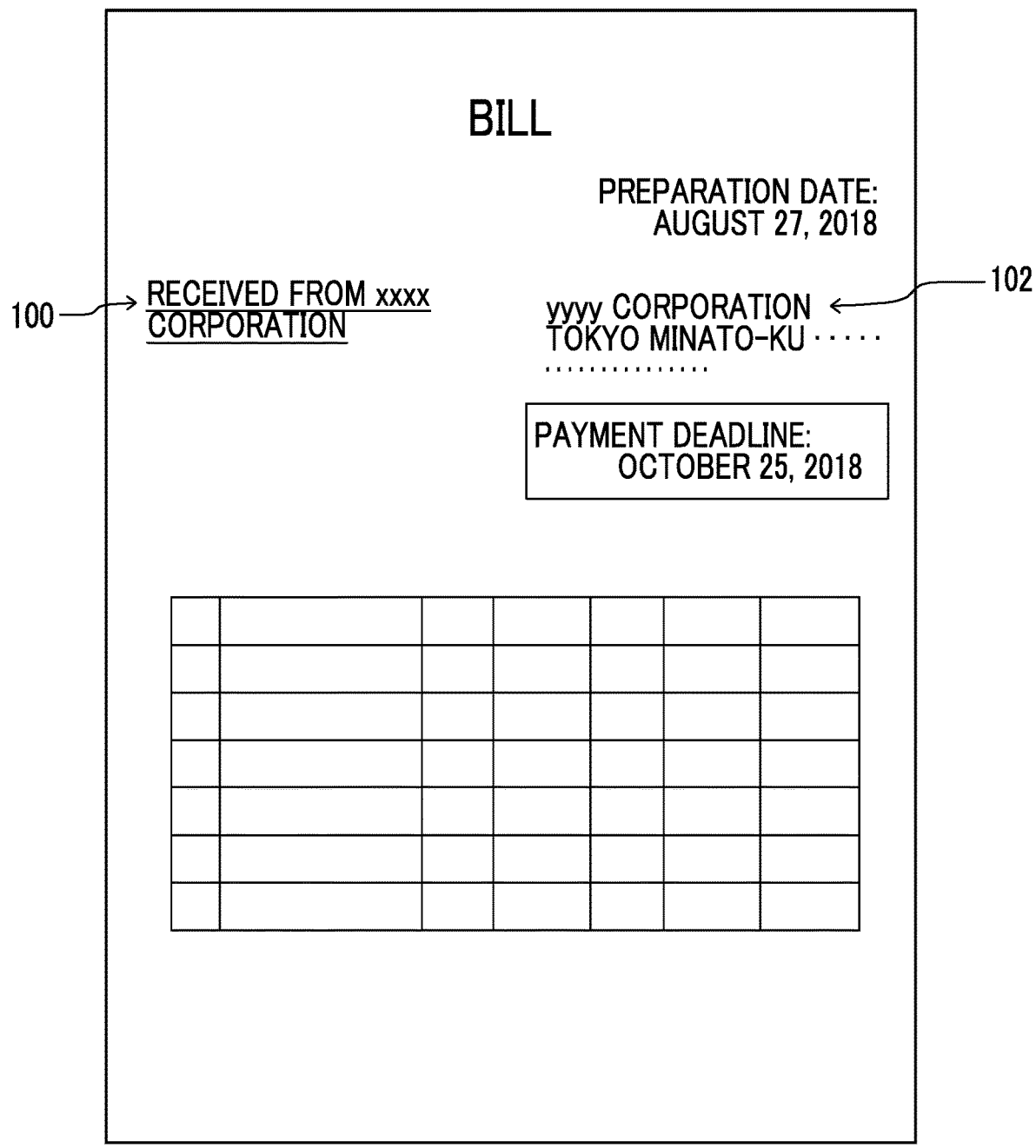
FIG. 9 is a second diagram illustrating the first example of the target document.

FIG. 9 illustrates the first example of the target document again. Based on the preparing person character information stored in the character string DB 24, the preparing person name giving unit 44 extracts the company name from the target document, among character strings extracted by the OCR processing unit 36 based on the character string indicative of the company name, such as "corporation" or "(Inc.)". In an example of FIG. 9, a company name 100 corresponding to a character string "received from xxxx corporation" and a company name 102 corresponding to a character string "yyyy corporation" are extracted.

In the example of FIG. 9, a plurality of company names are extracted. Therefore, the preparing person name giving unit 44 refers to the preparing person character information again, and determines the character string beginning with "received from", "sold to", or "from" is a company name, to which the user belongs, among the extracted company names. In addition, in a case where the company name to which the user belongs is registered in the preparing person character information and in a case where the company name extracted from the target document is identical or similar to the company name to which the user belongs, it may be determined that the company name is the company name to which the user belongs. In the example of FIG. 9, it is determined that the company name 100 is the company name to which the user belongs. The preparing person name giving unit 44 gives the remaining company name 102, that is, "yyyy corporation" as the attribute information of the target document.

Figure 10:
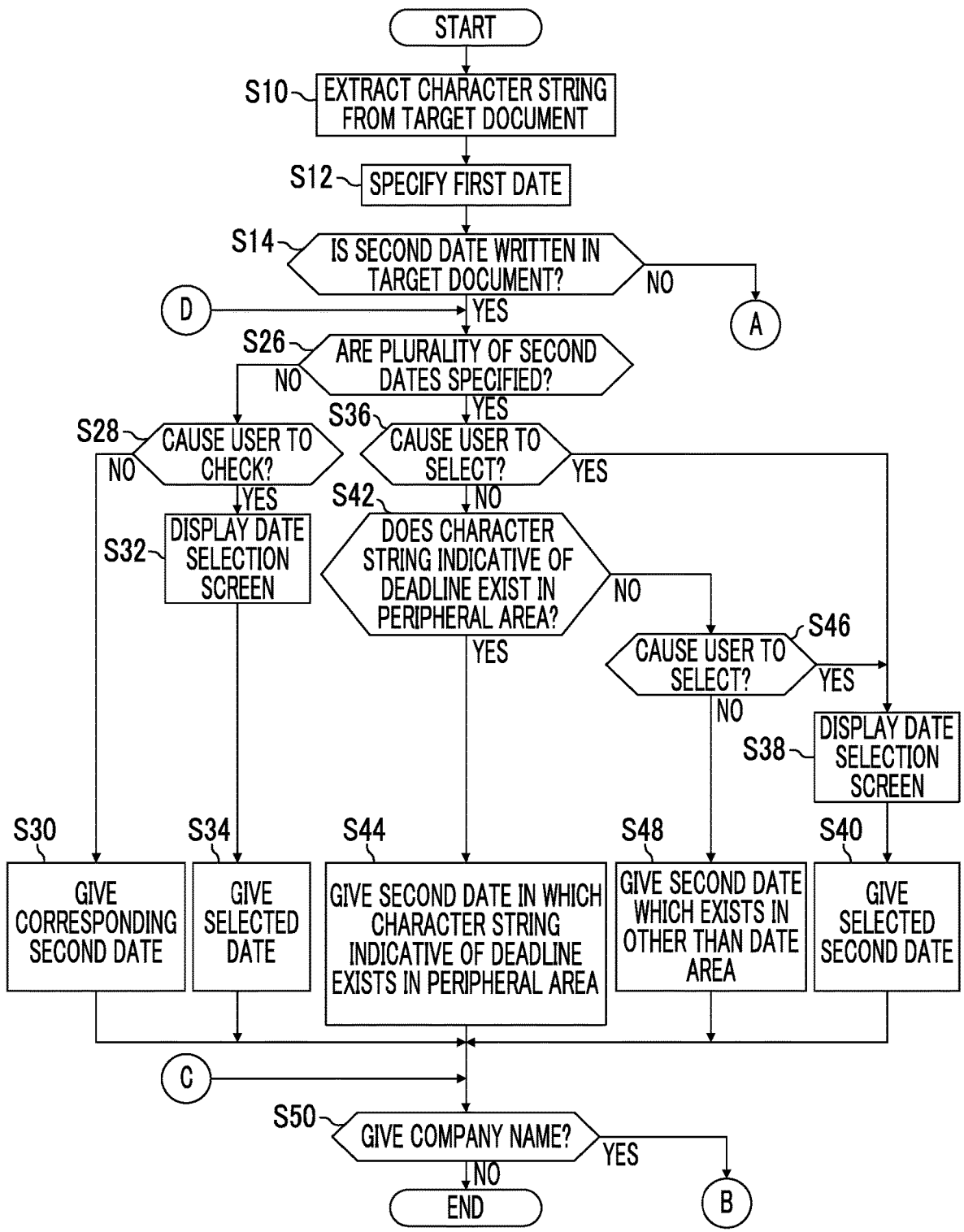
FIG. 10 is a first flowchart illustrating a flow of a process of the information processing apparatus according to the exemplary embodiment.
Figure 11:
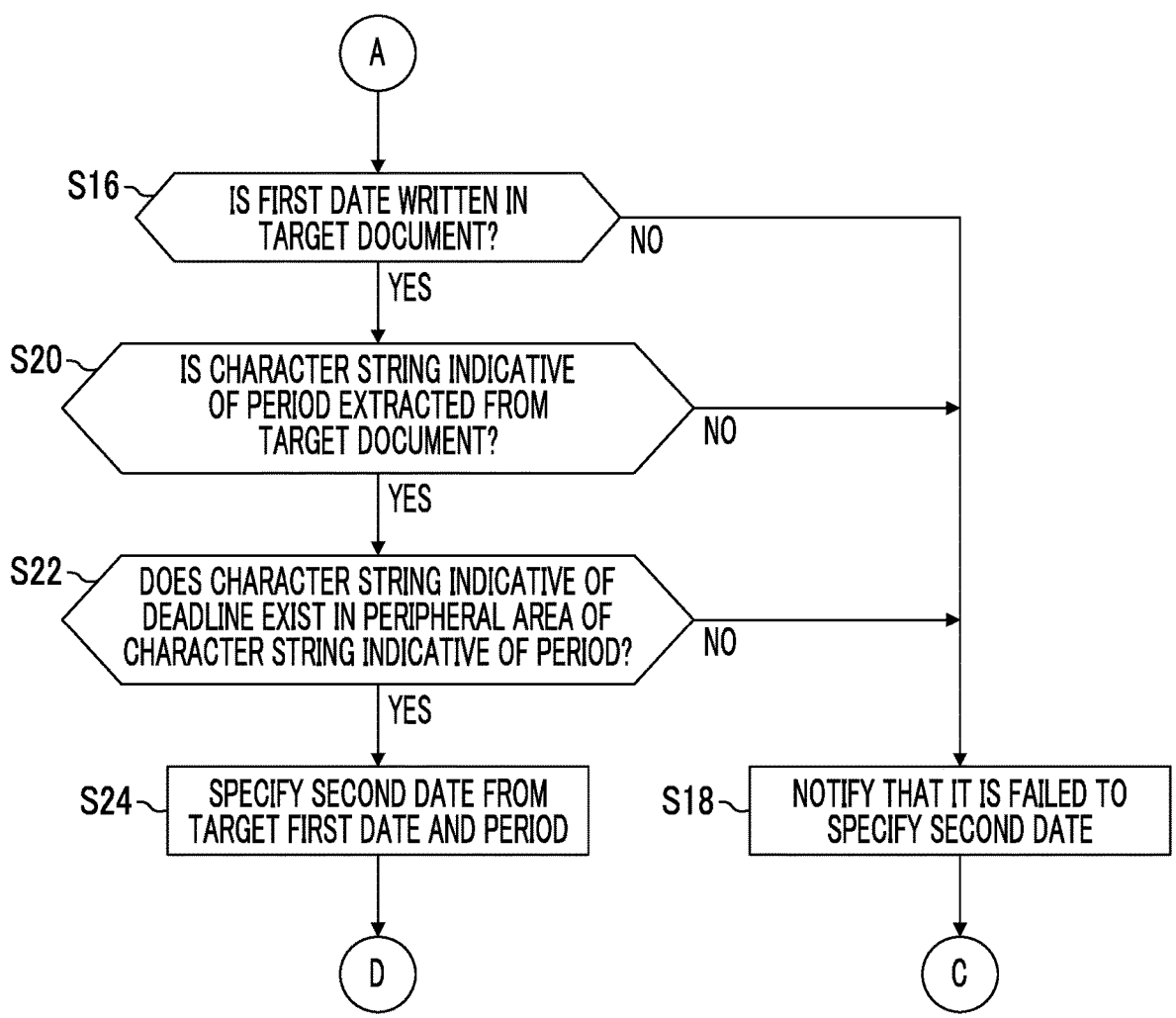
FIG. 11 is a second flowchart illustrating the flow of the process of the information processing apparatus according to the exemplary embodiment.
Figure 12:
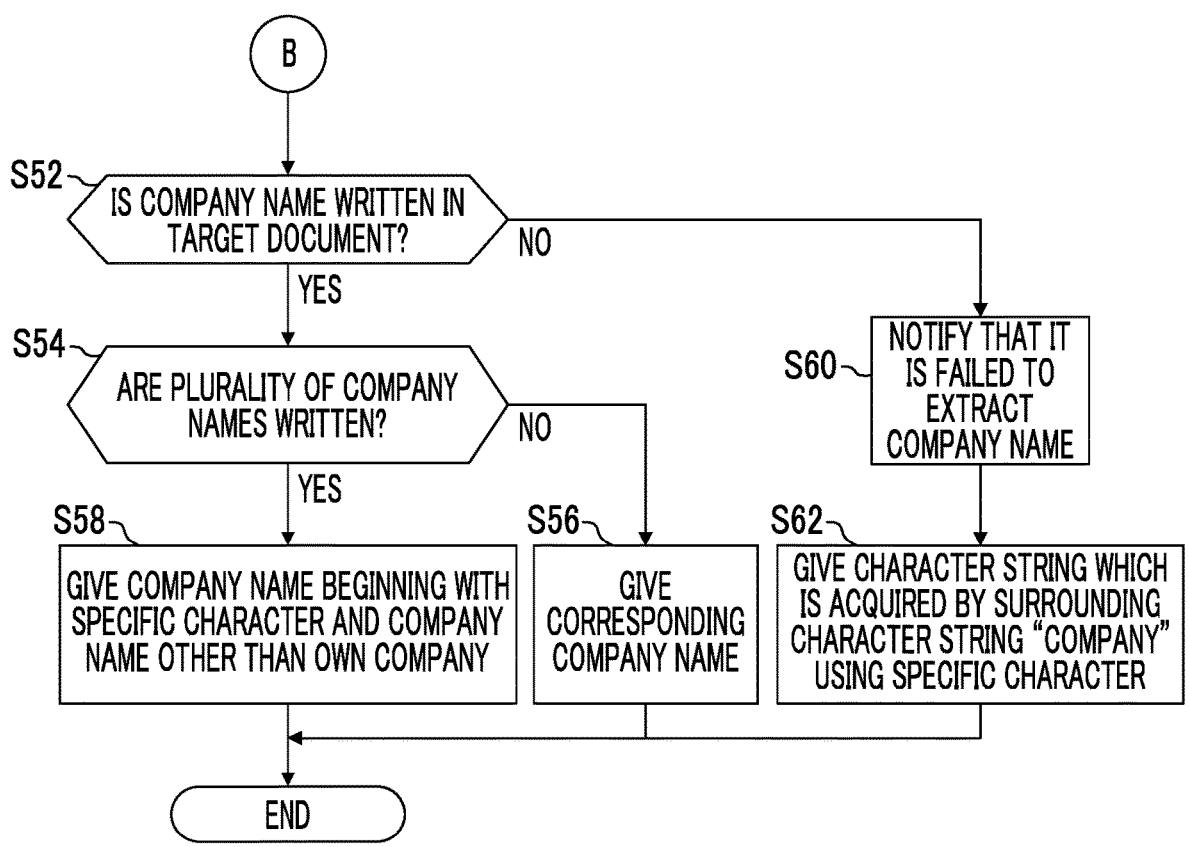
FIG. 12 is a third flowchart illustrating the flow of the process of the information processing apparatus according to the exemplary embodiment.

The configuration of the information processing apparatus 14 according to the exemplary embodiment is described as above. Hereinafter, a flow of the process of the information processing apparatus 14 will be described with reference to flowcharts illustrated in FIGS. 10 to 12.

In step S10, the OCR processing unit 36 extracts the character string from the target document.

In step S12, the attribute giving unit 38 specifies the first date. As described above, the first date is the date, on which the process is performed with respect to the target document, or the date written in the target document.

In step S14, the attribute giving unit 38 determines whether or not the second date which is the date after the first date specified in step S12 is written in the target document. In a case where the second date is not written in the target document, the process proceeds to step S16 of FIG. 11.

In the example, the attribute giving unit 38 specifies the second date based on the first date written in the target document and the period written in the target document. In step S16, the attribute giving unit 38 determines whether or not the first date specified in step S12 is written in the target document. In a case where the first date is not written in the target document, the process proceeds to step S18. In step S18, the display control unit 42 displays a screen, which indicates a fact that it is failed to specify the second date, on the display unit 28. Therefore, the fact that it is failed to specify the second date is notified to the user. Subsequent to step S18, the process proceeds to step S50 (refer to FIG. 10 which will be described later).

In a case where the first date is written in the target document, the process proceeds to step S20.

In step S20, the attribute giving unit 38 refers to the period character information stored in the character string DB 24, and determines whether or not the character string indicative of the period is extracted from the target document. In a case where the character string indicative of the period is not extracted, the process proceeds to step S18. In a case where the character string indicative of the period is extracted, the process proceeds to step S22.

In step S22, the attribute giving unit 38 refers to the deadline character information stored in the character string DB 24, and determines whether or not the character string indicative of the deadline exists in the peripheral area of the character string indicative of the period extracted in step S22. In a case where the character string indicative of the deadline does not exist in the peripheral area, the process proceeds to step S18. In a case where the character string indicative of the deadline exists in the peripheral area, the process proceeds to step S24.

In step S24, the attribute giving unit 38 specifies the date after the period extracted in step S20 as the second date from the first date specified in step S12. Subsequent to step S24, the process proceeds to step S26 of FIG. 10.

In step S26, the attribute giving unit 38 determines whether or not the plurality of second dates are specified. Here, a case where the plurality of second dates are specified includes the case where the plurality of second dates are written in the target document, the case where the plurality of periods are written in the target document, and the case where both the second date and the period are written in the target document. In a case where only one second date is specified, the process proceeds to step S28.

In step S28, the attribute giving unit 38 determines whether or not to cause the user to check the specified second date. For example, in a case where it is possible to specify only the second date, on which the character string indicative of the deadline does not exist, in the peripheral area, or in a case where it is possible to specify only the second date, on which at least a part of the title of the target document does not exist, in the peripheral area, the attribute giving unit 38 determines to cause the user to check the specified second date.

In a case where the user is not caused to check the specified second date, the process proceeds to step S30. In step S30, the attribute giving unit 38 gives the specified second date as the attribute information of the target document.

In a case where the user is caused to check the specified second date, the process proceeds to step S32. In step S32, the display control unit 42 displays the date selection screen (refer to FIG. 8), which includes the specified second date and the input field 88 for inputting the date by the user, on the display unit 28.

In step S34, the attribute giving unit 38 gives the second date, which is selected by the user on the date selection screen displayed in step S32, or the data, which is input by the user to the input field 88, as the attribute information of the target document.

Returning to step S26, in a case where the plurality of second dates are specified in step S26, the process proceeds to step S36.

In step S36, the attribute giving unit 38 determines whether or not to allow the user to select the plurality of specified second dates.

As described above, it is possible for the user to previously perform setting of whether or not to allow the user to select the plurality of second dates.

In a case where setting is performed such that the user selects the plurality of second dates, the process proceeds to step S38.

In step S38, the display control unit 42 displays the date selection screen (refer to FIG. 7), which includes the plurality of second dates, on the display unit 28.

In step S40, the attribute giving unit 38 gives the second date, which is selected by the user on the date selection screen displayed in step S38, as the attribute information of the target document.

Returning to step S36, in a case where the setting is performed such that the user does not select the plurality of second dates in step S36, the process proceeds to step S42.

In step S42, the attribute giving unit 38 refers to the deadline character information stored in the character string DB 24, and determines whether or not the character string indicative of the deadline exists in each peripheral area of information which corresponds to each specified second date and which is written in the target document. The information, which corresponds to the second date and which is written in the target document, is the second date in a case where the second date is written in the target document, and is a period which is written in the target document in a case where the second date is specified based on the first date and the period written in the target document.

In a case where the character string indicative of the deadline exists among any of the plurality of peripheral areas which correspond to the plurality of second dates, the process proceeds to step S44. In step S44, the attribute giving unit 38 gives the second date corresponding to the peripheral area, in which the character string indicative of the deadline exists, as the attribute information of the target document. In a case where there are the plurality of second dates corresponding to the peripheral area, in which the character string indicative of the deadline exists, the display control unit 42 displays the date selection screen as illustrated in FIG. 7 on the display unit 28, and causes the user to perform selection.

In a case where the character string indicative of the deadline does not exist in any of the plurality of peripheral areas which correspond to the plurality of second dates, the process proceeds to step S46.

In step S46, the attribute giving unit 38 determines whether or not to allow the user to select the plurality of specified second dates again. It is also possible for the user to previously perform setting of whether or not to cause the user to perform selection in step S46. In a case where the setting is performed such that the user selects the plurality of second dates, the process proceeds to step S38. In a case where the setting is performed such that the user does not select the plurality of second dates, the process proceeds to step S48.

In step S48, the attribute giving unit 38 specifies the date area of the target document based on the format of the target document, and gives the second date, which exists other than the date area, as the attribute information of the target document among the plurality of second dates. In a case where there are the plurality of second dates which exist other than the date area, the display control unit 42 displays the date selection screen as illustrated in FIG. 7 on the display unit 28, and causes the user to perform selection.

In step S50, the preparing person name giving unit 44 determines whether or not to give the preparing person of the target document as the attribute information of the target document. It is possible for the user to previously perform setting of whether or not to give the preparing person of the target document as the attribute information of the target document. In a case where the setting, in which the preparing person of the target document is given as the attribute information of the target document, is performed, the process proceeds to step S52 of FIG. 12. In a case where the setting in which the preparing person of the target document is not given as the attribute information of the target document, is performed, the process ends.

In step S52, the preparing person name giving unit 44 determines whether or not the company name is written in the target document based on the preparing person character information stored in the character string DB 24. In a case where the company name is written in the target document, the process proceeds to step S54.

In step S54, the preparing person name giving unit 44 determines whether or not the plurality of company names are written in the target document. In a case where the plurality of company names are not written in the target document, that is, in a case where one company name is written in the target document, the process proceeds to step S56. In step S56, the preparing person name giving unit 44 gives the company name as the attribute information of the target document.

In the case where the plurality of company names are written in the target document in step S54, the process proceeds to step S58.

In step S58, the preparing person name giving unit 44 refers to the preparing person character information again, and specifies the company name beginning with, for example, the specific character "received from", "sold to", or "from. Moreover, a company name other than the specified company name is given as the attribute information of the target document among the plurality of company names included in the target document.

Returning to step S52, in a case where the company name is not written in the target document in step S52, the process proceeds to step S60.

In step S60, the display control unit 42 displays a message which indicates that it is failed to extract the company name on the display unit 28. Therefore, a fact that it is failed to extract the company name is notified to the user.

In step S62, the preparing person name giving unit 44 gives a character string, which is acquired by surrounding a character string "company" using a specific character, for example, "###", as the attribute information of the target document. Therefore, it is possible for the user who views the attribute information of the target document afterward to grasp the fact that it is failed to extract the company name from the target document. Meanwhile, it is also possible for the user to manually give the company name as the attribute information of the target document.

Hereinabove, although the exemplary embodiment of the invention is described, the invention is not limited to the exemplary embodiment and various modifications are possible without departing from the gist of the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
 a processor, configured to:
   perform optical character recognition on a document to extract character strings therefrom;
   specify a first date on which the optical character recognition is performed to the document;
   determine whether a second date, which is a date after the first date, exists in the extracted character strings;
   in response to the second date existing in the extracted character strings, specify the second date;
   in response to the second date not existing in the extracted character strings and in response to a third date and a time period existing in the extracted character strings, and specify the second date according to the third date and the time period; and
 set the second date as attribute information of the document.

2. The information processing apparatus according to claim 1,
wherein, in a case where a plurality of the second dates are specified, the processor sets the second date, on which a specific character string exists in a peripheral area of the second date written in the document, as the attribute information of the document.

3. The information processing apparatus according to claim 2,
wherein the specific character string is a character string indicative of a deadline.

4. The information processing apparatus according to claim 2, wherein the processor is further configured to:
specify a title of the document,
wherein the specific character string is a character string which includes at least a part of the specified title of the document, and
wherein the processor sets the second date, on which at least the part of the specified title of the document exists in the peripheral area of a description in the document, as the attribute information of the document, the description corresponding to the second date.

5. The information processing apparatus according to claim 1, wherein the processor is further configured to:
in a case where a plurality of the second dates are specified, display a screen on a display, the screen allowing a user to select a date to be given as the attribute information of the document among the plurality of second dates.

6. The information processing apparatus according to claim 5,
wherein the processor displays the plurality of second dates, and peripheral areas of a description in the document, the description corresponding to the second date.

7. The information processing apparatus according to claim 6,
wherein the processor highlights the second date on which a character string indicative of a deadline exists in a peripheral area, compared to the second date on which the character string indicative of the deadline does not exist in the peripheral area.

8. The information processing apparatus according to claim 6, wherein the processor is further configured to:
specify a title of the document,
wherein the processor highlights the second date on which at least a part of the specified title of the document is included in the peripheral area, compared to the second date on which the specified title of the document is not included in the peripheral area.

9. The information processing apparatus according to claim 5,
wherein the processor highlights the second date on which a character string indicative of a deadline exists in a peripheral area, compared to the second date on which the character string indicative of the deadline does not exist in the peripheral area.

10. The information processing apparatus according to claim 5, wherein the processor is further configured to:
specify a title of the document,
wherein the processor highlights the second date on which at least a part of the specified title of the document is included in the peripheral area, compared to the second date on which the specified title of the document is not included in the peripheral area.

11. The information processing apparatus according to claim 1,
wherein the processor sets a date after a period, which is written in the document, from the first date as the second date.

12. The information processing apparatus according to claim 11,
wherein the processor sets a date after a period, in which a specific character string exists in a peripheral area of a character string indicative of the period, from the first date as the second date.

13. The information processing apparatus according to claim 1,
wherein, in a case where a plurality of second the dates are specified, the processor sets the second date, which is not different from the first date among the plurality of second dates for more than a predetermined time period, as the attribute information of the document.

14. The information processing apparatus according to claim 1, wherein the processor is further configured to:
acquire the document,
wherein the first date is a date on which the document is acquired.

15. The information processing apparatus according to claim 1,
wherein the first date is a preparation date of the document, which is specified from the information written in the document.

16. The information processing apparatus according to claim 15,
wherein the processor sets a date, which is written in a date area which is specified based on a format of the document and in which the preparation date of the document is written, as the first date.

17. The information processing apparatus according to claim 1, wherein the processor is further configured to:
in response to the third date and a date calculated according to the time period being earlier to the first date, not set the second date as attribute information of the document.

18. A non-transitory computer readable medium storing an information processing program causing a computer to:
perform optical character recognition on a document to extract character strings therefrom;
specify a first date on which the optical character recognition is performed to the document;
determine whether a second date, which is a date after the first date, exists in the extracted character strings;
in response to the second date existing in the extracted character strings, specify the second date;
in response to the second date not existing in the extracted character strings and in response to a third date and a time period existing in the extracted character strings, and specify the second date according to the third date and the time period, and specify the second date according to the third date and the time period; and
set the second date as attribute information of the document.

19. An information processing apparatus comprising:
OCR processing means for performing optical character recognition on a document to extract character strings therefrom; and
attribute giving means for specifying a first date on which the optical character recognition is performed to the document, determining whether a second date, which is a date after the first date, exists in the extracted character strings, specifying the second date in response to the second date existing in the extracted character strings, specifying the second date according to a third date and a time period in response to the second date not existing in the extracted character strings and in response to the third date and the time period existing in the extracted character strings, and setting the second date as attribute information of the document.

* * * * *